United States Patent [19]

Yamaguchi et al.

[11] Patent Number: 4,971,165
[45] Date of Patent: Nov. 20, 1990

[54] CAR HEIGHT ADJUSTING APPARATUS FOR A TRACTOR

[75] Inventors: Tatsuo Yamaguchi; Kiyohide Kikkawa, both of Hikone, Japan

[73] Assignee: Yanmar Diesel Engine Co., Ltd., Japan

[21] Appl. No.: 425,393

[22] Filed: Oct. 24, 1989

Related U.S. Application Data

[63] Continuation of Ser. No. 117,277, Nov. 6, 1987, abandoned.

[51] Int. Cl.[5] .............................................. B60K 17/30
[52] U.S. Cl. .................................... 180/253; 180/348; 180/900; 180/906; 280/47
[58] Field of Search ................... 280/47, 43.17, 43.24; 180/9.52, 24.01, 900, 905, 906, 252, 253, 348, 374, 376

[56] References Cited

U.S. PATENT DOCUMENTS

| | | | |
|---|---|---|---|
| 1,793,482 | 2/1931 | Hendrickson ...................... | 180/900 |
| 1,868,474 | 7/1932 | Strehlow ............................. | 180/906 |
| 4,418,783 | 12/1983 | Teraoka et al. .................. | 180/75 X |

FOREIGN PATENT DOCUMENTS

| | | | |
|---|---|---|---|
| 242251 | 1/1963 | Australia ............................. | 180/905 |
| 56-51612 | 5/1981 | Japan . | |
| 56-112326 | 9/1981 | Japan . | |
| 59-202938 | 11/1984 | Japan .................................. | 180/900 |
| 736884 | 9/1955 | United Kingdom ............... | 180/24.1 |

Primary Examiner—Charles A. Marmor
Assistant Examiner—Tamara L. Finlay
Attorney, Agent, or Firm—Saidman, Sterne, Kessler & Goldstein

[57] ABSTRACT

A car height adjusting apparatus for a tractor, which lifts the car body by utilizing the driving power of the tractor and thereby without using a lifting device, such as a jack or a crane.

1 Claim, 10 Drawing Sheets

CAR HEIGHT ADJUSTING APPARATUS FOR A TRACTOR

This application is a continuation, of application Ser. No. 117,277, filed 11-6-87, now abandoned.

FIELD OF THE INVENTION

The present invention relates to a car height adjusting apparatus for a tractor which operates by increasing the height thereof for cultivation at ridges, for example between ricefields and by reducing the same for working at an orchard, for example, while running under branches.

BACKGROUND OF THE INVENTION

Car height adjusting apparatus for the tractor is disclosed in a Japanese Patent Laid-Open Gazette No. sho 56-112326 and the Japanese Utility Model Laid-Open Gazette No. sho 56-51612.

In the Japanese Patent Laid-Open Gazette No. sho 56-112326, a lifting device, such as a jack or a crane, is required to adjust the height of the car, and to lift the car body.

In the Japanese Utility Model Laid-Open Gazette No. sho 56-51612, a drive system for lifting a car body separate from a car-driving system is required for the same purpose.

SUMMARY OF THE INVENTION

An object of the present invention is to provide a car height adjusting apparatus for a tractor which lifts the body by utilizing a driving power of the tractor, but not using, as is conventional, a lifting device, such as a jack or a crane.

Referring to the drawings, particularly FIG. 2, a rear wheel axle casing 11 is rotatable with respect to a rear axle housing 12 in order to adjust the car height at rear wheel R. When fixed bolts at both the members 11 and 12 are removed. The car body has a tendency to lower in a single stroke or movement due to the weight of the car.

For example, since a car-height adjusting clutch for enabling drive of front wheel only is disposed toward the rear wheel R from a rear wheel differential gear D, when the car-height adjusting clutch is disconnected, rear wheel axle 16 and rear wheel side shaft 7 are made rotatable, so that there is the danger of the car body lowering in a single stroke.

In order to avoid such condition, the present invention provides a lock means or pin 14 interposed between the rear wheel axle casing 11 and the rear axle housing 12, so that, even when the fixed bolts 29 are removed, the lock pin 14 will prevent the car body from lowering at a stroke.

After the fixed bolts 29 are removed, and when the lock pin 14 is intended to be pulled out to reduce the car height, the lock pin 14, which is subjected directly to the weight of the car body, must first be lifted over the car height to thereby form a gap between the lock pin 14 and an engaging recess 11f at the rear wheel axle casing 11.

Also, a load release sensor S1 is provided which detects when the rear wheel axle casing 11 rotates to the position where the gap is formed.

Furthermore, a lock pin sensor S2 is provided which detects whether or not its lock is released, when the lock pin 14 is removed, after detecting that the load is released until the gap is formed.

Since the front wheels and rear wheels cannot simultaneously change the car height, when the height of the front wheels is changed, the driving power transmitted to the rear wheels is terminated by a height adjusting clutch means, thereby enabling only the front wheels to be driven.

Hence, the rear wheels are adapted to be movable longitudinally of the car body along movement for adjusting the car height at the front wheels.

Next, when the height at the rear wheels is changed, the driving power transmitted to the front wheels is terminated and the rear wheels only are gradually driven so that the front wheels are adapted to be freely movable along longitudinal movement of rear wheels for adjusting the car height.

Thus, a car height adjusting clutch is provided which is not needed on the conventional tractor and can drive the front wheels only.

In the state where the height adjusting clutch is used to cut off power, the fixed bolts between the rear wheel axle casing 11 and the rear axle housing 12 may be removed. In such condition, bending moment is applied between the rear wheel axle casing 11 and the rear axle housing 12.

An insertable overlap portion is constituted between an inner cylinder 11a of rear wheel axle casing 11 and a cylinder of rear axle housing 12, thereby being subjected to the bending moment, in which an abutting portion of a rear axle casing side axle 8 and a clutch shaft 6 is formed in a bending manner to an extent of a slight gap therebetween.

Since the abutting portion of both the axles 8 and 6 bends, a car height adjusting clutch shifter 9 moved onto one axle in order to disconnect the clutch is not insertable, when intended to slide by a biasing spring 38 to be reinserted into the other axle for engaging the clutch.

The present invention has been designed to cut another portion to absorb a bend created between the rear axle casing side axle 8 and the clutch axle 6 on the rotary central axle so that parts between the clutch shaft 6 and the rear wheel side axle 7 are connected with each other by a coupling 10.

DESCRIPTION OF THE PREFERRED EMBODIMENT

Next, an embodiment of a car height adjusting apparatus for a tractor of the invention will be described in accordance with the accompanying drawings.

Figure 1:
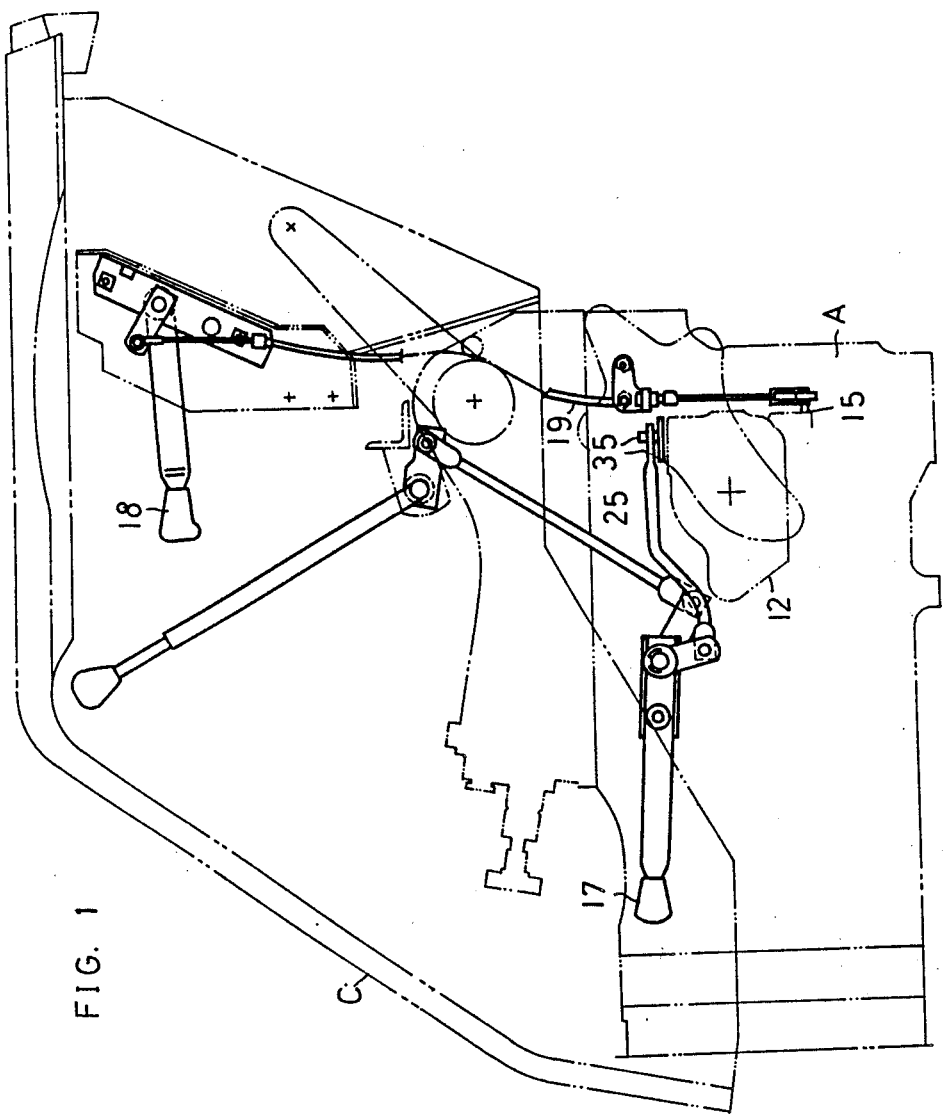
FIG. 1 is a left side view showing part of a fender of a tractor C.

Referring to FIG. 1, a rear axle casing A is disposed between left and right fenders C.

A rear wheel lock pin control lever 18 and a car height adjusting clutch lever 17 are disposed inside the fender C.

The rear wheel lock pin control lever 18 is adapted to rotate a lock pin shifter shaft 15 through a control wire 19.

Figure 4:
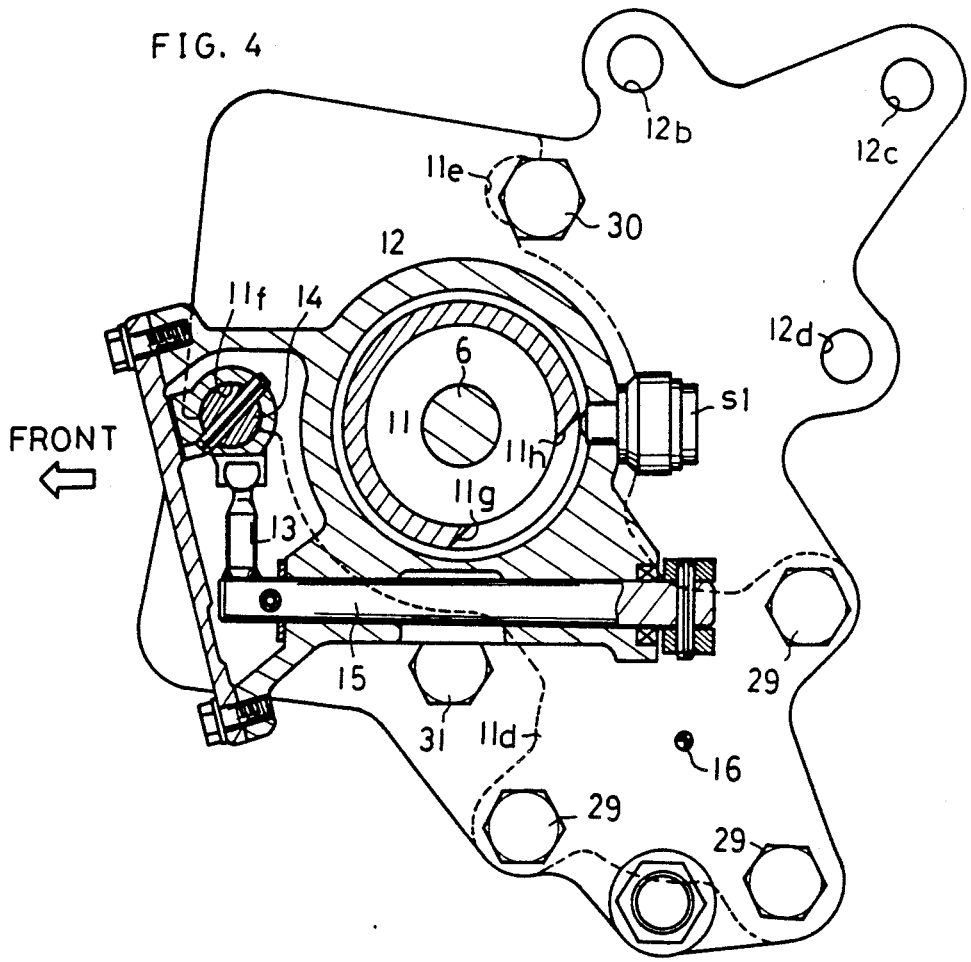
FIG. 4 is a sectional left side view of part of a lock pin shifter shaft 15.

The lock pin shifter shaft 15, as shown in FIG. 4, perforates or extends there through a rear axle housing 12. A lever 13 at the utmost end of the lock pin shifter shaft 15 slides a lock pin 14 laterally of the forward moving direction of the car so as to engage or disengage the rear axle housing 12 and the rear wheel axle casing 11.

Figure 3:
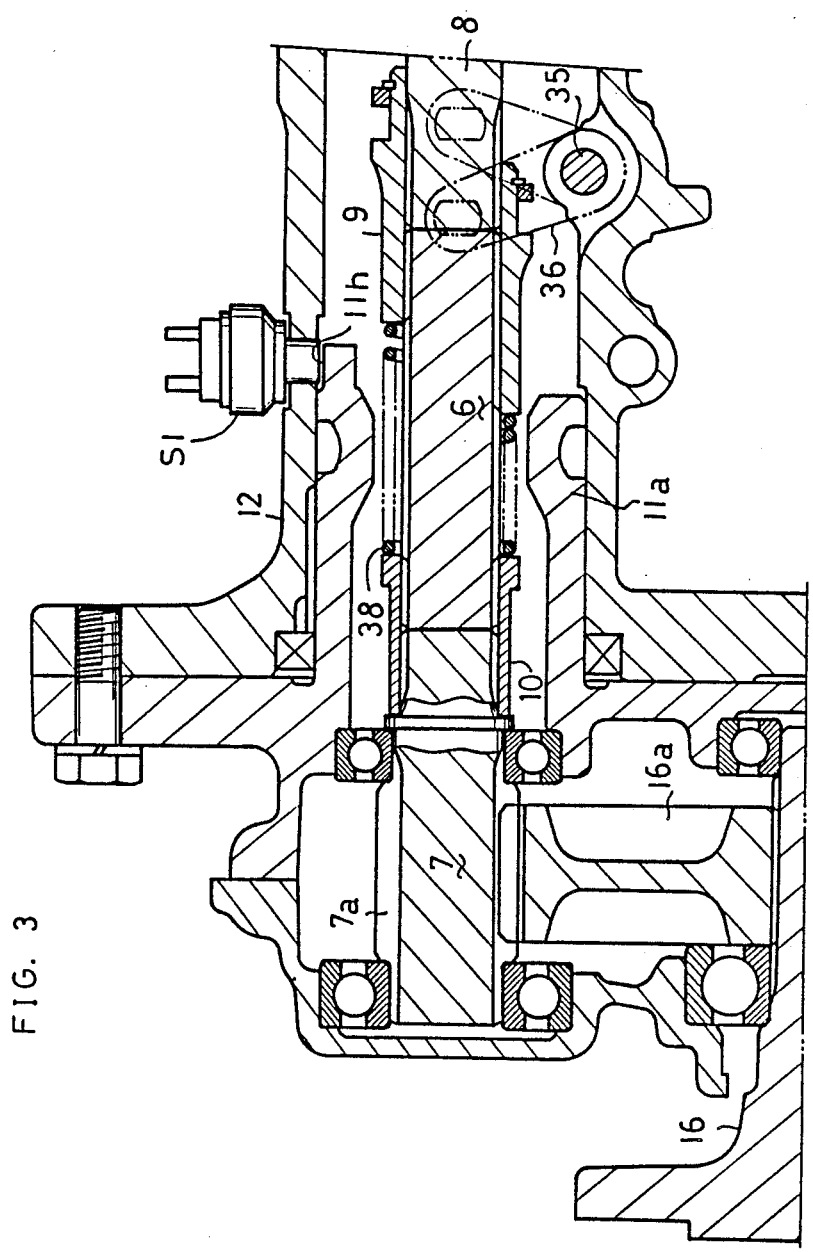
FIG. 3 is a sectional rear view of the rear axle housing 12 at the left side and part of the rear axle casing 11.

The car height adjusting clutch lever 17 turns a shifter 36 with respect to a shifter shaft 35 best seen in FIG. 3, thereby sliding a height adjusting clutch shifter 9 in the clutch engaging or disengaging direction.

Referring to FIGS. 2 through 7, explanation will be given on a car height adjusting structure for the rear wheel R portion of the car.

Rear axle housings 12 are attached to both lateral sides of rear axle casing A.

A smaller diameter insertion portion 11a of the rear wheel axle casing 11 is fitted into a tubular portion open at the lateral end of each rear axle housing 12.

The smaller diameter insertion portion 11a and rear axle housing 12 carry out therebetween vertical rotation for adjusting the height.

A differential gear D is disposed in the rear axle casing A so that shafts projecting laterally from the differential gear D, in this embodiment, constitute rear axle casing side shafts 8. A brake device B is disposed at the outer periphery of each rear axle casing side shaft 8.

The car height adjusting clutch shifter 9 is sleeved coaxially on the rear axle casing side shaft 8 and on a clutch shaft 6. When the fixed bolts 29 between the rear axle housing 12 and the rear wheel axle casing 11 are removed, a bend is generated between the rear axle casing side shaft 8 and the clutch shaft 6.

Hence, once the car height adjusting clutch shifter 9 is removed, it is difficult to re-insert it because of the urging force of the spring 38.

In order to prevent the above difficulty, another shaft dividing portion, or joint, is provided between the clutch shaft 6 and the rear wheel axle casing 11 to thereby separate the clutch shaft 6 from the rear wheel side shaft 7 through the shaft dividing portion shaft.

A coupling 10 is sleeved on both the shafts 6 and 7 and connects them to an extent that a slight bend is allowable.

The center shaft 6, the car height adjusting clutch shifter 9 and the coupling 10, are provided at only one rear axle housing 12.

The reason for the above is that when the clutch is released on one side shaft 8, rotation of the other side shaft is transferred through the differential gear D to a differential side gear shaft on the released side shaft. Thereby, there is no need for the clutch and coupling 10 to be provided at both rear axle housings.

Figure 2:
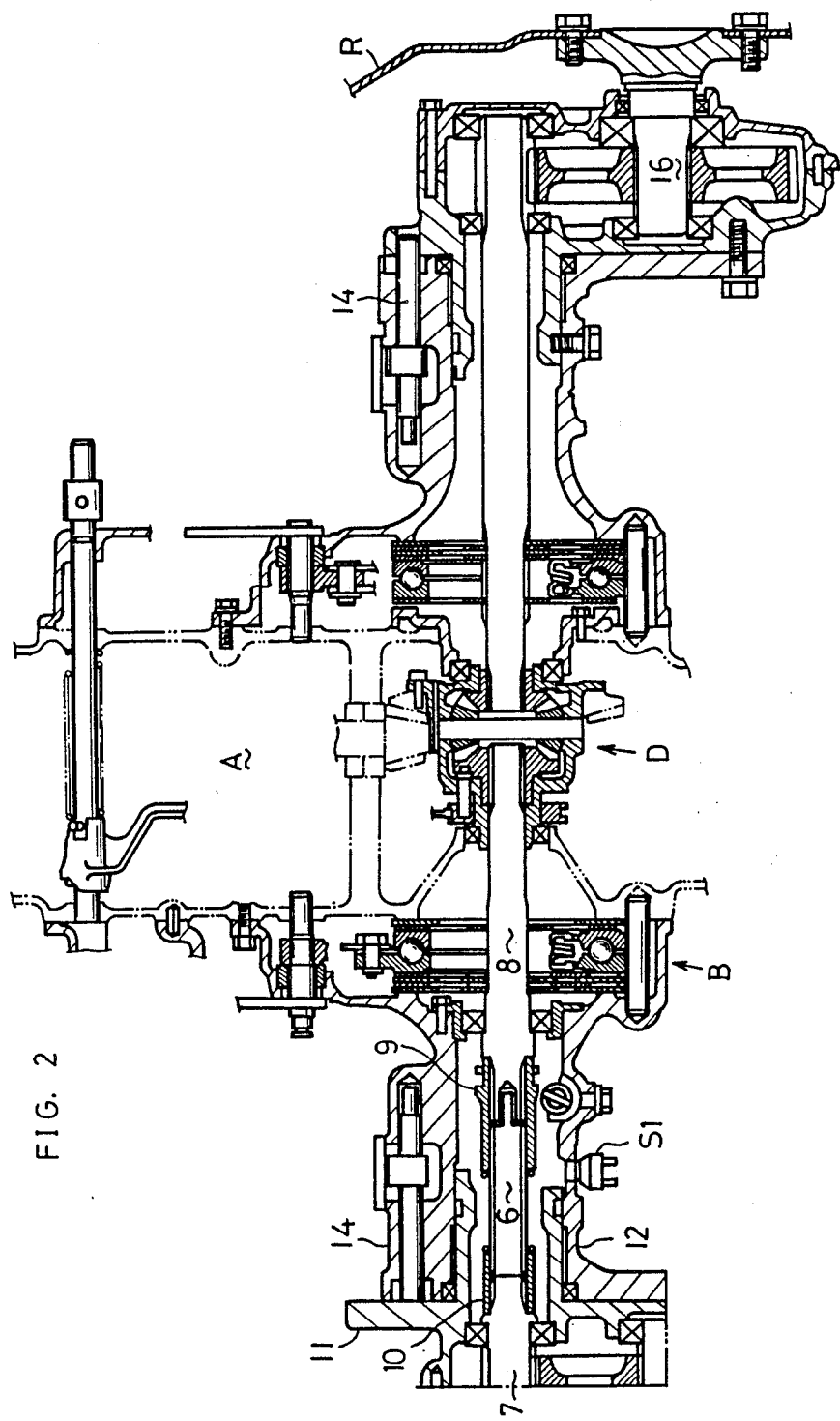
FIG. 2 is a sectional plan view of a rear axle casing A, a rear axle housing 12 and part of a rear axle casing 11.

Referring to FIG. 2, a lock pin 14, which locks the rear axle housing 12 and the rear wheel axle casing 11 for safety during adjusting of the car height, is interposed between the rear axle housing 12 and the rear wheel axle casing 11.

The lock pin 14 is required because a car height adjusting clutch means is interposed between the differential gear D and the rear wheel. Therefore, when the clutch means is disconnected the rear wheel side shaft 7 freely rotates. Hence, when the fixed bolts 29 are removed and the car height adjusting clutch is disconnected, the rear wheel axle casing 11 rotates in a single movement at a stroke toward the lower side of car height tending to cause accidents.

No clutch means is interposed between the differential gear and the front wheels. Therefore, even when the fixed bolts are removed for reversely driving bevel gears at the differential gear, and rotational resistance is largely applied thereto, there is no fear that the car body will lower at a stroke.

Figure 6:
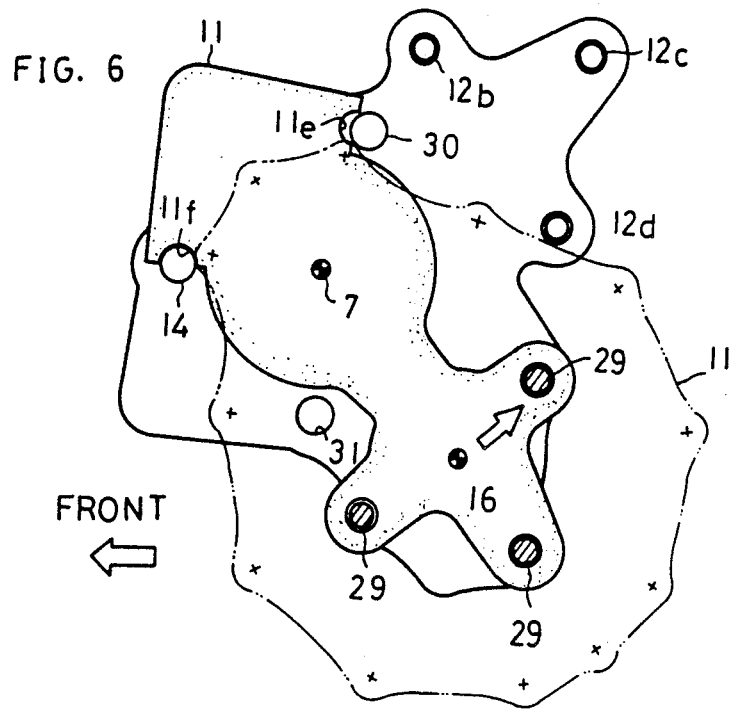
FIG. 6 is a left side view showing the positional relation between the rear wheel axle casing 11 and the rear axle housing 12 supporting the casing 11 when the car height is high.
Figure 7:
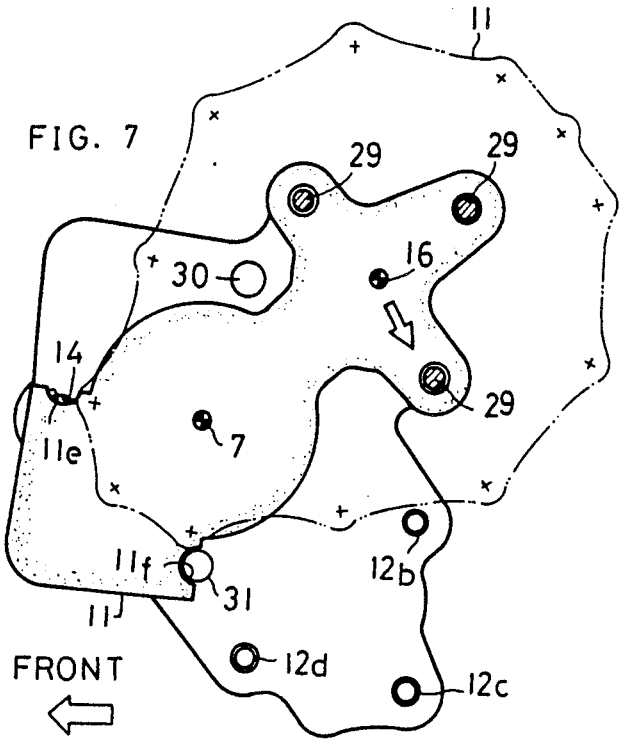
FIG. 7 is a left side view of the positional relation between the casing and the housing when the car height is low.
Figure 8:
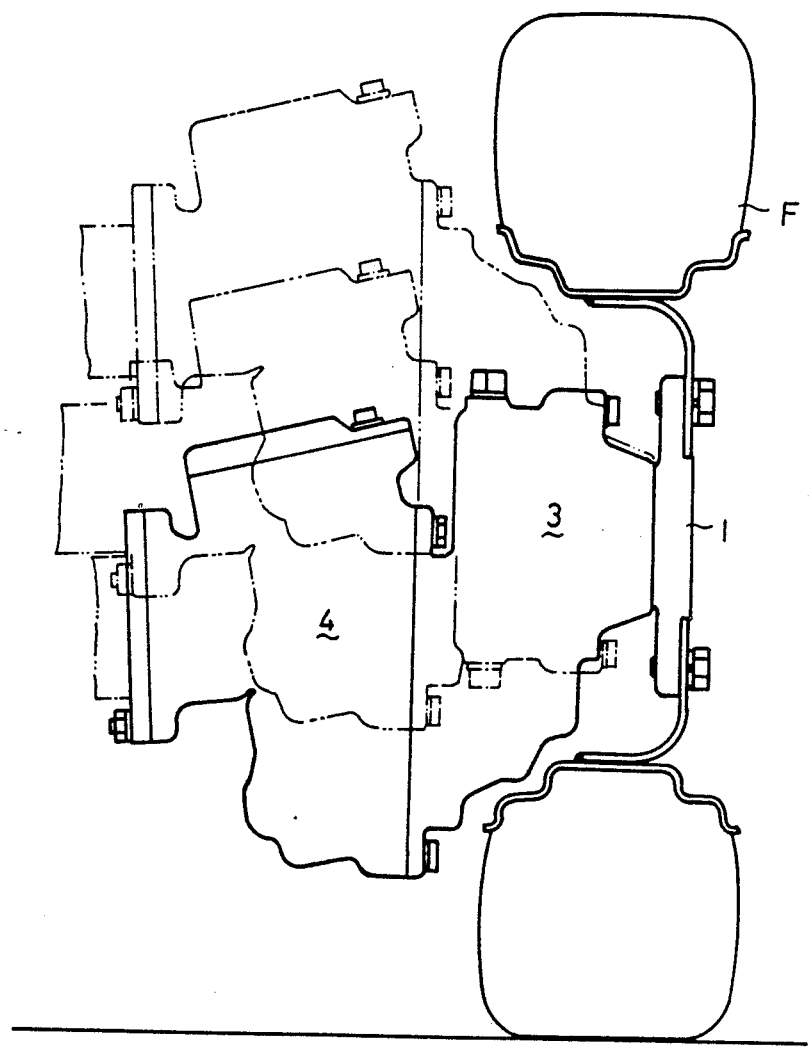
FIG. 8 is a front view showing a height adjusting portion for front wheels.
Figure 9:
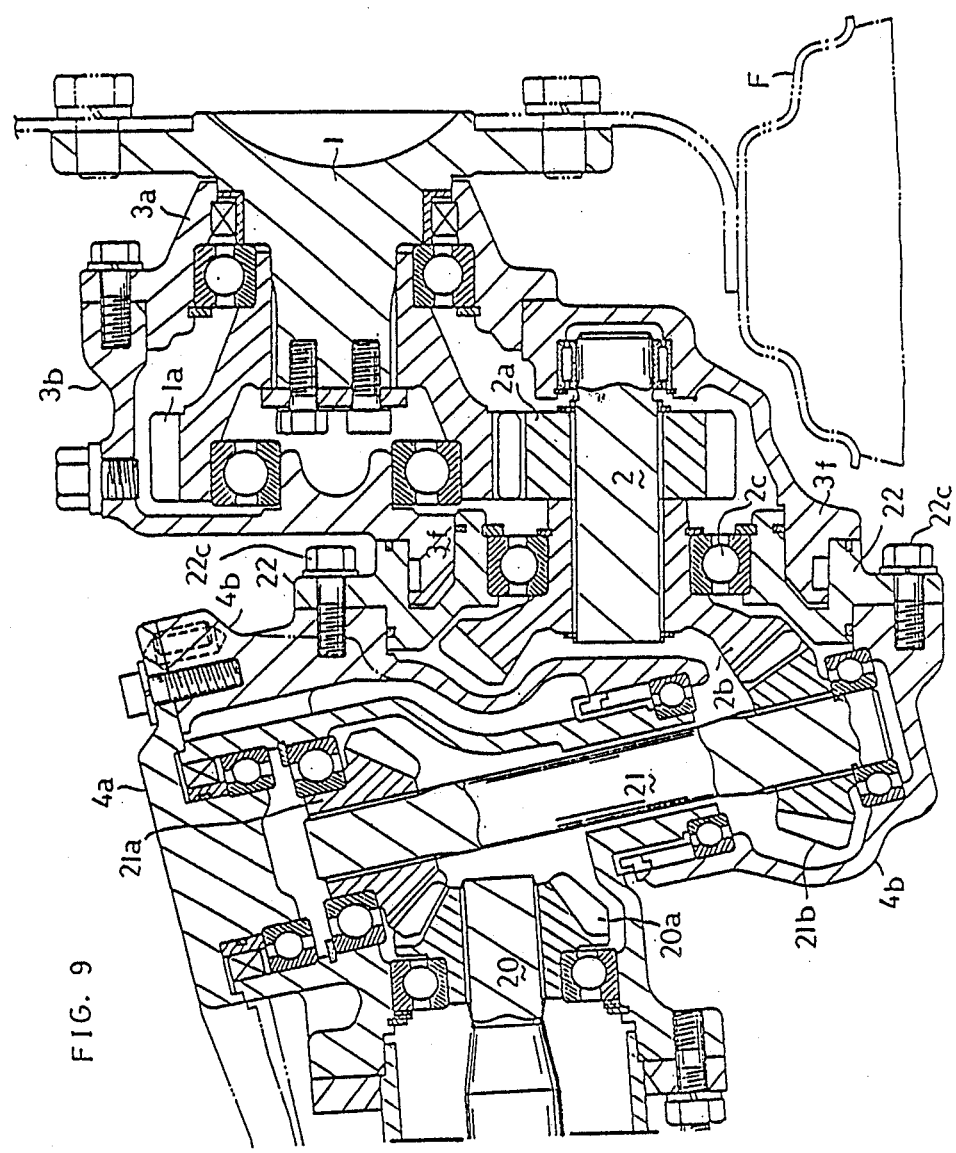
FIG. 9 is an enlarged sectional front view of a steering gear box 4 and part of front wheel axle 3.

Another reason for the above is that in the case of the rear wheels, as shown in FIGS. 6 and 7, the rear wheel axle casing 11 vertically rotates at an angle of 90° in condition of being subjected to a body weight. In the front wheels, a front wheel axle casing 3 rotates vertically at an angle of 180°, whereby it is difficult to convert the car body weight into a force for rotating the front wheel axle casing 3.

At the high and low positions of the car height, the lock pin 14 projects from the side of the rear axle housing 12 and is fitted into recess 11f provided at the rear wheel axle casing 11 as shown in FIG. 6, thereby locking the lowering rotation from the high position of car height at the rear wheel axle casing 11 to the low position.

Normally, the rear wheel axle casing 11 and rear axle housing 12 are completely fixed by screwing the fixed bolts 29 with threaded bores 12b, 12c and 12d respectively.

In the case where the car height is adjusted from the high position to the low position, the engaging recess 11f at the rear wheel axle casing 11 abuts against the lock pin 14 so that the lock pin 14 is subjected to the total weight of rear wheels R. Hence, even when the lock pin 14 is intended to be removed, both the lock pin 14 and rear wheel axle casing 11 engage with each other, whereby the lock pin 14 cannot be removed.

Hence, it is necessary that the rear wheel axle casing 11 is first rotated, raised over the high position of car height, and rotated to the position where the engaging recess 11e abuts against a retainer pin 30. Abutment of lock pin 14 against the engaging recess 11f at the rear wheel axle casing 11 is released, and rear wheel lock pin control lever 18 is used to remove the lock pin 14.

A load release sensor means S1, which detects whether or not the engaging recess 11f rotates away from the lock pin 14, is mounted at the outer periphery of rear axle housing 12 as shown in FIG. 4.

The load release sensor S1 abuts at its utmost end against the vicinity of a cutout 11g to 11h formed at part of the outer periphery of the rear wheel axle casing 11.

In the state where the utmost end of the load release sensor S1 moves from the recess of cutout 11h to the larger diameter portion, the lock pin 14 leaves the engaging recess 11f at the rear wheel axle casing 11 and the engaging recess 11e abuts against the retainer pin 30.

In this case, the above state is displayed near an operator's seat so that the operator may activate the rear wheel lock pin control lever 18 to remove the lock pin 14.

Figure 5:
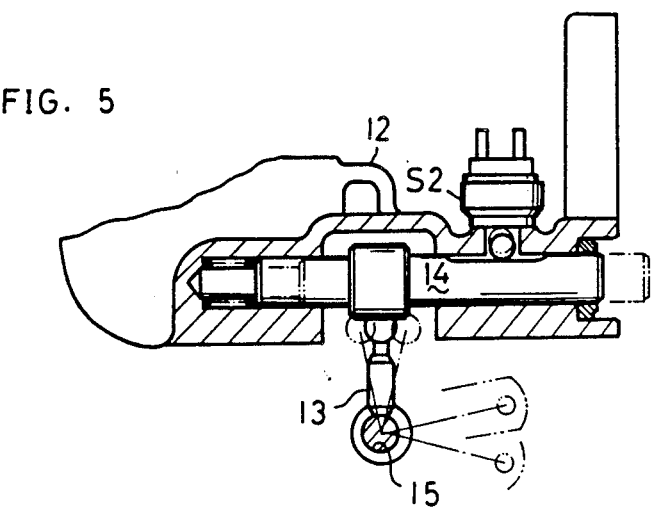
FIG. 5 is a sectional view of a lock pin 14 and a lock pin sensor S2.

A lock pin sensor means S2, which detects whether or not the lock pin 14 is removed by the rear wheel lock pin control lever 18, is provided as shown in FIG. 5 and is also displayed near the operators seat indicating that the lock pin 14 is removed.

In FIG. 6, reference numeral 31 designates a retainer pin for when the rear wheel axle casing 11 rotates toward the low side.

At the rear axle housing 12 threaded bores 12b, 12c and 12d for the fixed bolts 29 are open at the high and low height positions of the car.

When the height of rear wheels R is adjusted, the front wheel clutch (not shown) is disconnected and wedges are disposed at both sides of the wheels not to move the rear wheels R and the fixed bolts 29 are removed and then the lock pin 14 is removed.

When the car body is lifted from the low position to the high position, the transmission is set to move the car forward and the car is gradually. At this time, since the rear wheels are not rotatable due to the wedges, a first gear 7a at the rear wheel side shaft 7 rises around the second gear 16a while engaging it in order to rotate the rear wheel axle casing 11 around the rear wheel axle 16.

At the position where the gear 7a rises to the highest position where the load release sensor S1 is activated, the rear wheel lock pin control lever 18 is operated to fit the lock pin 14 into the engaging recess 11f and stop the car from driving forward. Then, the rear wheel axle casing 11 lowers and is stabilized by contact of the engaging recess 11f with the lock pin 14.

When the car body is lowered from the high position of car height, the transmission is first is set to move the car forward, and the car body is lifted from the high position where the load release sensor S1 is activated, thereby forming a gap between the engaging recess 11f and the lock pin 14.

Next, the rear wheel lock pin control lever 18 is operated to remove the lock pin 14. The transmission is changed to reverse and the car is gradually rearwardly driven while exerting a braking action, thereby lowering the car body.

FIGS. 8 through 12 show a car height adjusting unit for front wheels.

A steering gear box 4 comprises a stationary steering gear box 4a and a rotary steering gear box 4b. The rotary steering gear box 4b supports at its side surface a rotary shaft holder 22 attached thereto by bolts 22c.

Part 3f of the front wheel axle casing 3 is fitted into a round groove at the rotary shaft holder 22. The front wheel axle casing 3 and front wheel axle 1 rotate vertically around the front wheel rotation central shaft 2 for adjusting the car height. A front wheel shaft gear 2a fixed to the front wheel rotation central shaft 2 engages with a front wheel axle gear 1a fixed to the front wheel axle 1. When the car height is adjusted, the front wheel shaft gear 1a is fixed as not to rotate, while the gear 2a rotates therearound.

Rotary power of the front wheel F is transmitted from a front axle 20 and front wheel axle bevel gear 20a to the front wheel rotation central shaft 2 through a king-pin shaft 21 having first and second bevel gears attached thereto, 21a and 21b and then from the third front wheel shaft gears 2a and 2b at the front wheel rotation central shaft 2 to the fourth front wheel axle gear 1a at the front wheel axle 1.

Figure 10:
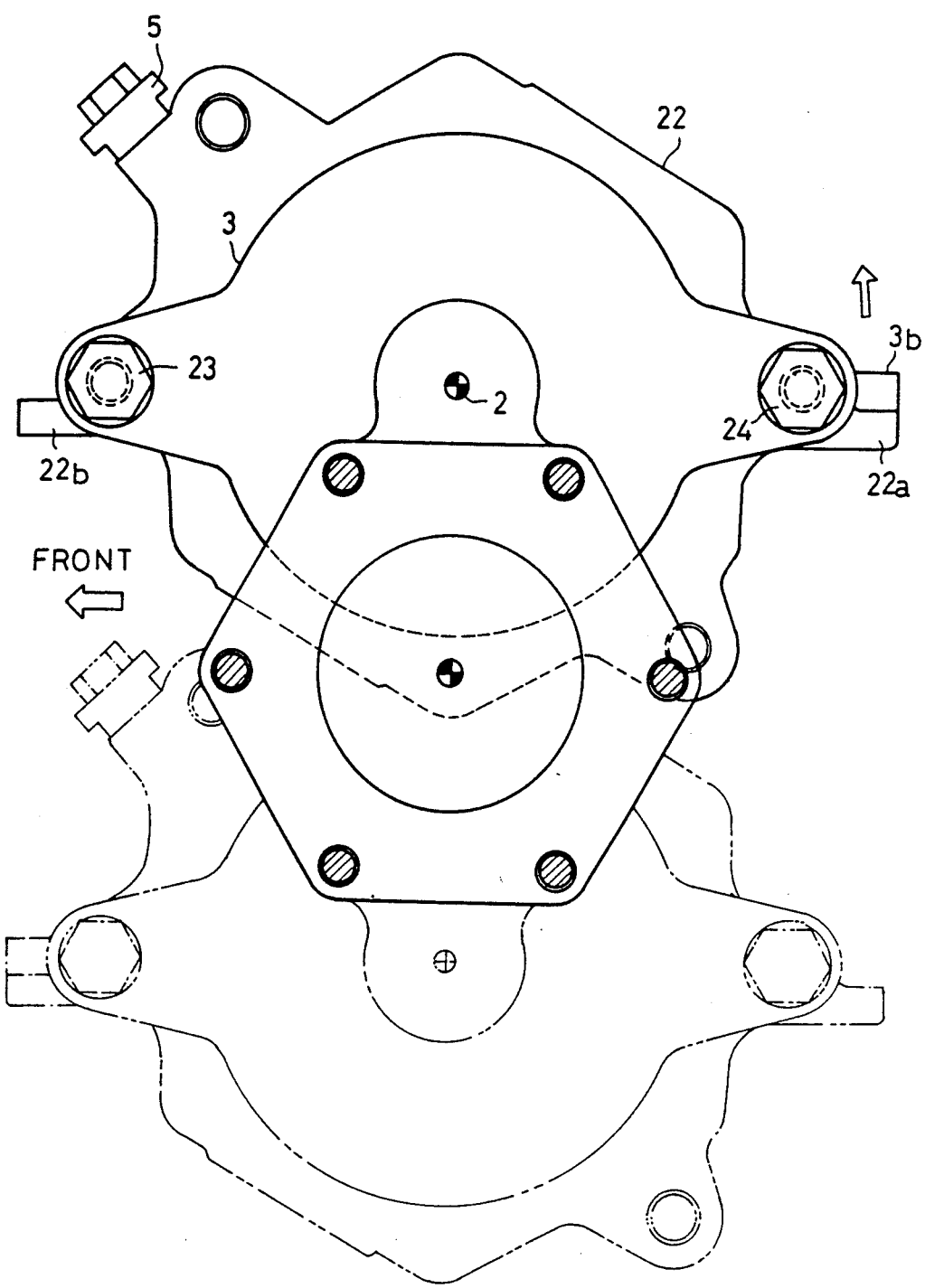
FIG. 10 is a left side view showing the state where the front wheels are at a higher height.
Figure 11:
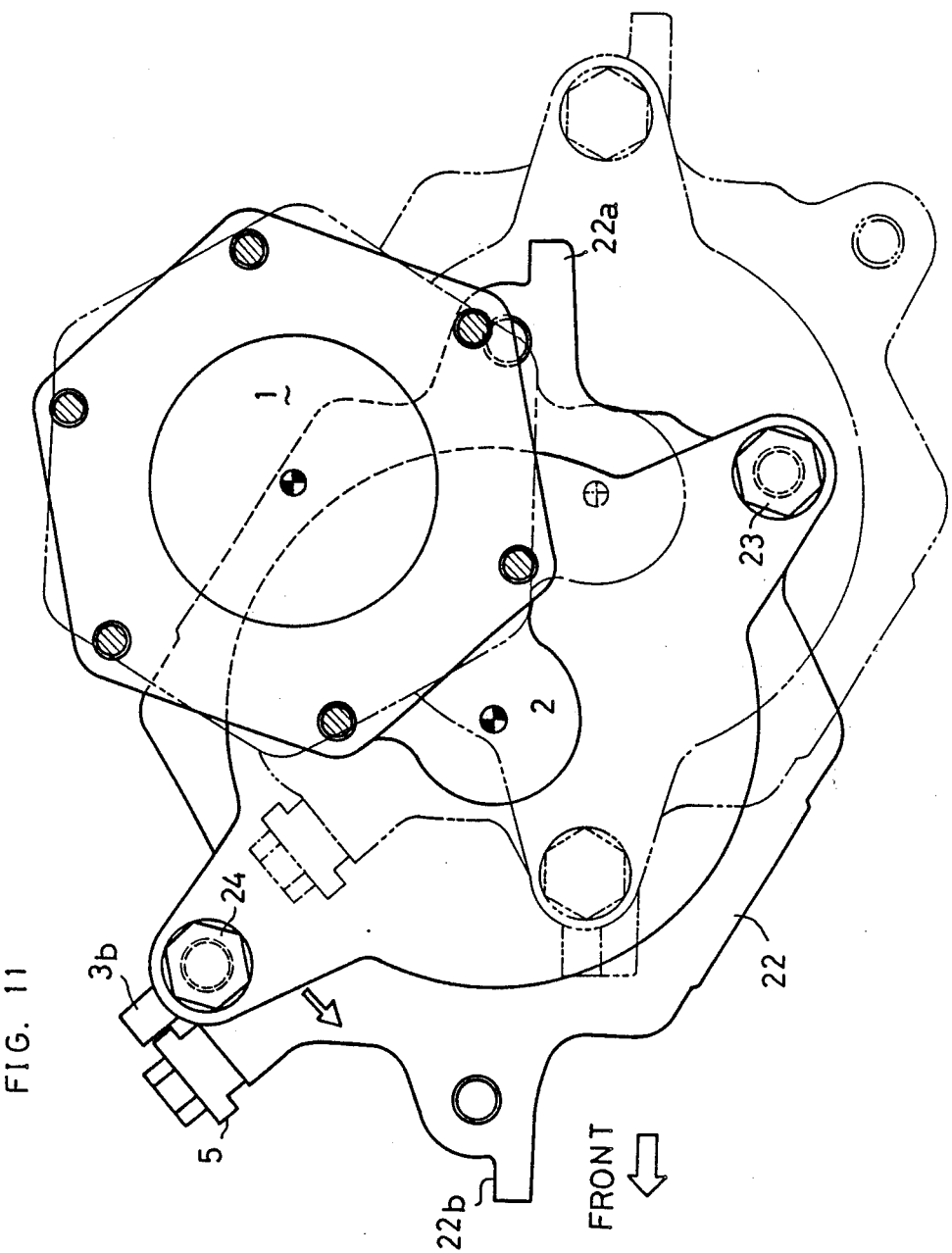
FIG. 11 is a left side view showing the front wheels at an intermediate height.
Figure 12:
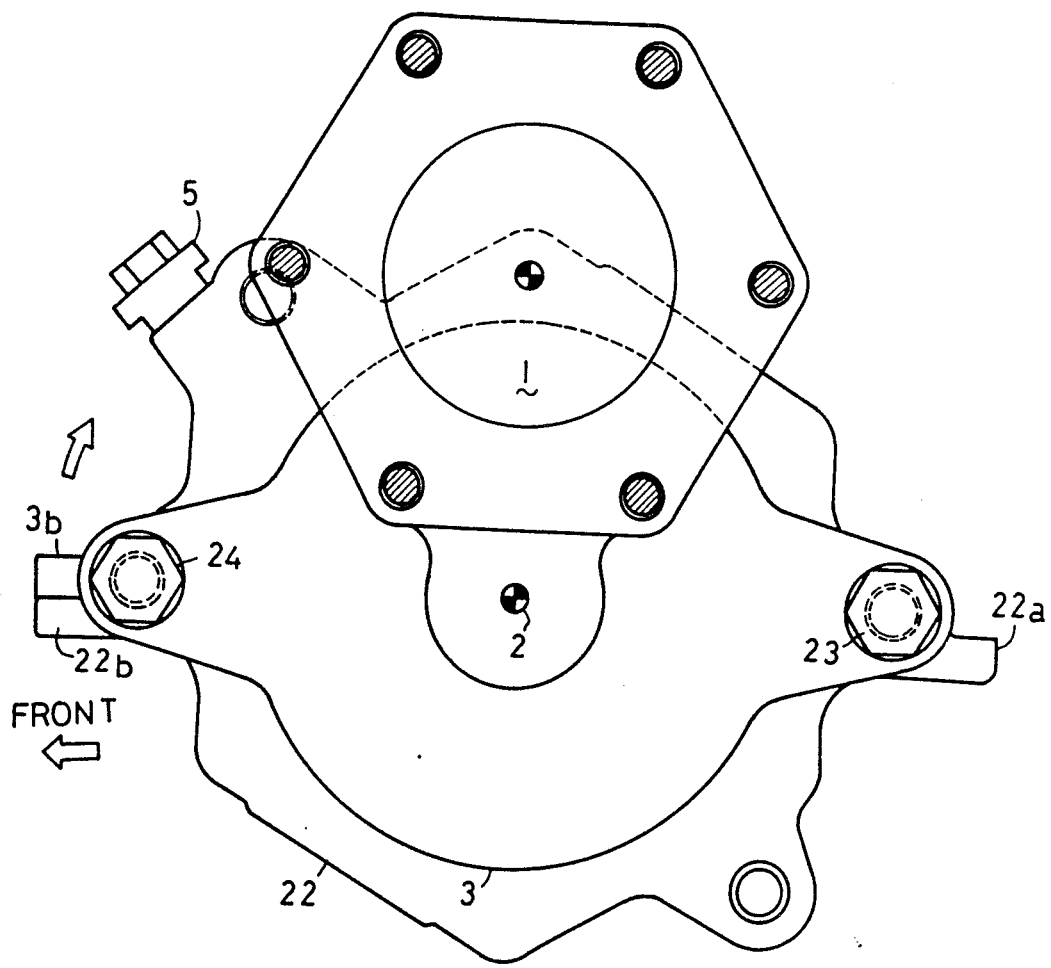
FIG. 12 is a left side view showing the front wheels at a low height.

Reference numeral 3a designates a lid for the front wheel axle casing 3. As shown in FIGS. 10, 11 and 12, the rotary shaft holder 22 and front wheel axle casing 3 rotate to perform therebetween rotation for adjusting the car height. A stopper 5 is provided between the holder 22 and the casing 3.

In detail, at the rotary shaft holder 22 are provided a high position stopper 22a when the car height is high as shown in FIG. 10 and a low position stopper 22b when low as shown in FIG. 11. A detachable middle position stopper 5 is fixed to the holder 22 by a bolt between the high position stopper 22a and the low position stopper 22b.

A projection stopper 3b is also provided thereon, which abuts against the high position stopper 22a, middle position stopper 5 and low position stopper 22b to stop rotation of the front wheel axle casing 3.

After adjusting the car height, the fixed bolts 23 and 24 fix the front wheel axle casing 3 and rotary shaft holder 22.

In the case where the car height is raised to the high position, wedges are inserted under the front wheels F to fix rotation thereof and the fixed bolts 23 and 24 are removed to allow lifting the front wheels F, the transmission or means for adjusting the vehicle height is set to forward for driving whereby the front wheel axle 1 is not rotated. Hence, the gear 2a rotating at the front wheel rotation central shaft 2 is gradually lifted as it rotates around the gear 1a in engagement therewith, and rotates the front wheel axle, case 3, while bevel gears 2b and 21b remain in engagement with one another whereby the front wheel rotation central shaft 2 moves to a position higher than the front wheel axle 1 as shown in FIG. 10.

On the other hand, when the front wheels lower from the high position, the transmission is set to reverse and the car is gradually driven, so that the gear 2a at the front wheel rotation central shaft 2 rotationally lowers as it rotates around the gear 1a at the front wheel axle 1 in the engaging therewith, thereby enabling the front wheels to be prevented from lowering abruptly.

While a preferred embodiment of the invention has been described using specific terms, such description is for illustrative purpose only, and it is to be understood that changes and variations may be made without departing from the spirit or scope of the following claims.

What is claimed is:

1. An apparatus comprising means for adjusting the height of a vehicle by the vehicle driving power without having to manually raise the vehicle wheels from the ground, said adjusting means comprising:
  a front wheel axle casing (3) including at least one projection stopper (3b);
  a rotary steering gear box (4b);
  a rotary shaft holder (22) which is joined at one side to said front wheel axle casing (3) and at another side to said rotary steering gear box (4b), said rotary shaft holder including a plurality of stoppers (22a, 22b) between which said projection stopper (3b) rotates;
  a front wheel rotation central shaft (2) supported by said rotary shaft holder (22);

a front wheel axle (1), wherein at least a portion of said front wheel axle casing (3) is interposed between said front wheel axle (1) and said front wheel rotation central shaft (2);

a front wheel shaft gear (2a) disposed on said front wheel rotation central shaft (2);

a king pin shaft (21), a portion of said king pin shaft being disposed within said rotary steering gear box (4b);

a first bevel gear (21a) disposed on one end of said king pin shaft (21) and a second bevel gear (21b) disposed on an other end of said king pin shaft (21);

a front axle (20) including a front axle bevel gear (20a) for driving said first bevel gear (21a) of said king pin shaft (21);

a front wheel axle gear (1a) disposed on said front wheel axle (1);

wherein said front axle bevel gear (20a) engages said first bevel gear (21a) to rotate said king pin shaft (21) and said second bevel gear (21b), which engages said front wheel bevel gear (2b) to rotate said front wheel rotation central shaft (2) and said front wheel shaft gear (2a), and said front wheel shaft gear (2a) is in engagement with said front wheel axle gear (1a);

whereby rotation of said front wheel shaft gear (2a) by the driving force of said front axle (20), causes said front wheel axle casing (3) to rotate about said rotary shaft holder (22) to adjust the front wheel height of the vehicle while said second bevel gear (21b) and said front wheel shaft bevel gear (2b) remain in engagement with one another.

* * * * *